US012212663B1

(12) United States Patent
Carrel et al.

(10) Patent No.: US 12,212,663 B1
(45) Date of Patent: Jan. 28, 2025

(54) BOUNDED BROADCAST ENCRYPTION KEY MANAGEMENT

(71) Applicant: GRAPHIANT, INC., Fremont, CA (US)

(72) Inventors: David Carrel, Tiburon, CA (US); Stefan Olofsson, Dubai (AE); Neale Ranns, Hure (FR); Ijsbrand Wijnands, Leuven (BE)

(73) Assignee: GRAPHIANT, INC., Fremont, CA (US)

( * ) Notice: Subject to any disclaimer, the term of this patent is extended or adjusted under 35 U.S.C. 154(b) by 267 days.

(21) Appl. No.: 17/977,816

(22) Filed: Oct. 31, 2022

(51) Int. Cl.
*H04L 9/08* (2006.01)

(52) U.S. Cl.
CPC .......... *H04L 9/0825* (2013.01); *H04L 9/0822* (2013.01); *H04L 9/088* (2013.01); *H04L 9/0891* (2013.01)

(58) Field of Classification Search
CPC ..... H04L 9/0825; H04L 9/0822; H04L 9/088; H04L 9/0891
USPC .......................................................... 380/30
See application file for complete search history.

(56) References Cited

U.S. PATENT DOCUMENTS

| 10,630,476 | B1* | 4/2020 | de Quehen | H04L 9/0852 |
| 2003/0163697 | A1* | 8/2003 | Pabla | H04L 9/0838 |
| | | | | 713/171 |
| 2013/0297939 | A1* | 11/2013 | Sundaram | H04L 9/0847 |
| | | | | 713/171 |
| 2016/0065362 | A1* | 3/2016 | Choyi | H04L 63/065 |
| | | | | 380/279 |
| 2018/0167206 | A1 | 6/2018 | Raza et al. | |
| 2019/0140826 | A1* | 5/2019 | Carrel | H04L 9/0827 |
| 2020/0235929 | A1* | 7/2020 | Jacobs | H04L 9/3073 |
| 2022/0294611 | A1* | 9/2022 | Katsumata | H04L 63/061 |
| 2023/0396432 | A1* | 12/2023 | Del Pino | H04L 9/0891 |
| 2023/0421357 | A1* | 12/2023 | Soriente | H04L 9/3255 |

FOREIGN PATENT DOCUMENTS

| EP | 3766220 A1 | 1/2021 | |
| WO | WO-2006000239 A1 * | 1/2006 | ......... H04L 63/0853 |

* cited by examiner

*Primary Examiner* — Hee Soo Kim
(74) *Attorney, Agent, or Firm* — Maschoff Brennan

(57) ABSTRACT

Embodiments for bounded broadcast encryption key management in a peer-to-peer network are described. To realize bounded broadcast encryption key management, a second peer of the peer-to-peer network receives a first broadcast message from a first peer. The first broadcast message includes at least a public key associated with the first peer. The second peer then generates a key seed in response to receiving the first broadcast message, and creates a second message that includes the key seed encapsulated with the public key. The second peer then transmits the second message to the first peer, and in response to the transmission of the second message, receives a packet from the first peer. The packet includes data encrypted using a secret key derivable from the key seed and one or more portions of the second message.

20 Claims, 8 Drawing Sheets

600

Avoid, by the first peer, fragmentation to the first message —S602

Add, by the second peer, fragmentation to the second message —S602'

FIG. 6B

BOUNDED BROADCAST ENCRYPTION KEY MANAGEMENT

FIELD OF THE INVENTION

Embodiments discussed in the present disclosure are generally related to encryption key management. In particular, the embodiments discussed are related to mechanisms for bounded broadcast encryption key management.

BACKGROUND OF THE INVENTION

Traditionally, secure encrypted communication between two entities requires that they first exchange keys by secure physical means. Most traditional mechanisms for encryption key establishment are generally built using a commutative key exchange mechanism. An example of one such traditional mechanism is Diffie-Hellman key exchange mechanism. However, most existing key exchange mechanisms are not post-quantum secure, in that, such key exchange mechanisms do not offer a sufficient level of security against a cryptanalytic attack by a quantum computer.

Further, some traditional mechanisms for encryption key establishment in peer-to-peer networks use key encapsulation instead of key exchange. The key encapsulation mechanisms do not rely on the commutative properties for key exchange as required by the key exchange mechanisms (e.g., by Diffie-Hellman key exchange mechanism), which is in a way advantageous for the encryption key management. However, traditional key encapsulation mechanisms do not scale well for environments where a large number of encryption peers must establish secure communication channels in a variety of network topologies. Further, due to the peer-to-peer nature of communication (realized by means of traditional key encapsulation mechanisms for peer-to-peer encryption key management) between encryption peers, required advertisement and maintenance tasks (for the encryption peers) also suffer from scaling challenges and large computational overhead.

Further, existing solutions for encryption key establishment only support post-quantum secure algorithms in a peer-to-peer communication model, and not in a broadcast communication model.

In view of the above-described challenges, there is a need for establishment of secure communication channels among any desired number of encryption peers in any desired network topology of communication.

SUMMARY OF THE INVENTION

The embodiments described herein include at least a system including a first peer and a second peer in a peer-to-peer network for encryption key management, a method performed by the corresponding first peer and implemented in the peer-to-peer network, and a method performed by the corresponding second peer and implemented in the peer-to-peer network. The embodiments presented herein address at least some of the above challenges. The embodiments described support broadcasting the presence and initiation sequence for the establishment of secure communication channels among any number of encryption peers in any network topology of communication.

In accordance with the embodiments of this disclosure, a system in a peer-to-peer network for encryption key management is described. The system includes a first peer and a second peer. The first peer broadcasts, at least to the second peer, a first message including at least a public key associated with the first peer. The second peer receives, from the first peer, the first message. The second peer then generates a key seed in response to the reception of the first message, and subsequently, creates a second message including the key seed encapsulated with the public key. Then, the second peer transmits, to the first peer, the second message. The first peer receives, from the second peer, the second message including the key seed encapsulated with the public key. Subsequently, the first peer creates an outbound Security Association based on which, data is to be transmitted to the second peer. Herein, the outbound Security Association is created by decapsulation of the key seed based at least on the second message. Then, the first peer creates a secret key based at least on the second message (on the key seed and one or more portions of the second message). The secret key is for encrypting the data to be transmitted to the second peer. Subsequently, the first peer transmits, to the second peer, a packet including the data encrypted using the secret key. The secret key is derivable from the key seed and one or more portions of the second message. The second peer then receives, from the first peer, the packet including the data encrypted using the secret key.

BRIEF DESCRIPTION OF THE DRAWINGS

Further advantages of the invention will become apparent by reference to the detailed description of preferred embodiments when considered in conjunction with the drawings:

FIG. 6A illustrates an example flowchart describing a method, implemented in a peer-to-peer network, for avoiding fragmentation to a message, in accordance with an embodiment.

FIG. 6B illustrates an example flowchart describing a method, implemented in a peer-to-peer network, for adding fragmentation to a message, in accordance with an embodiment.

DETAILED DESCRIPTION

Figure 1:
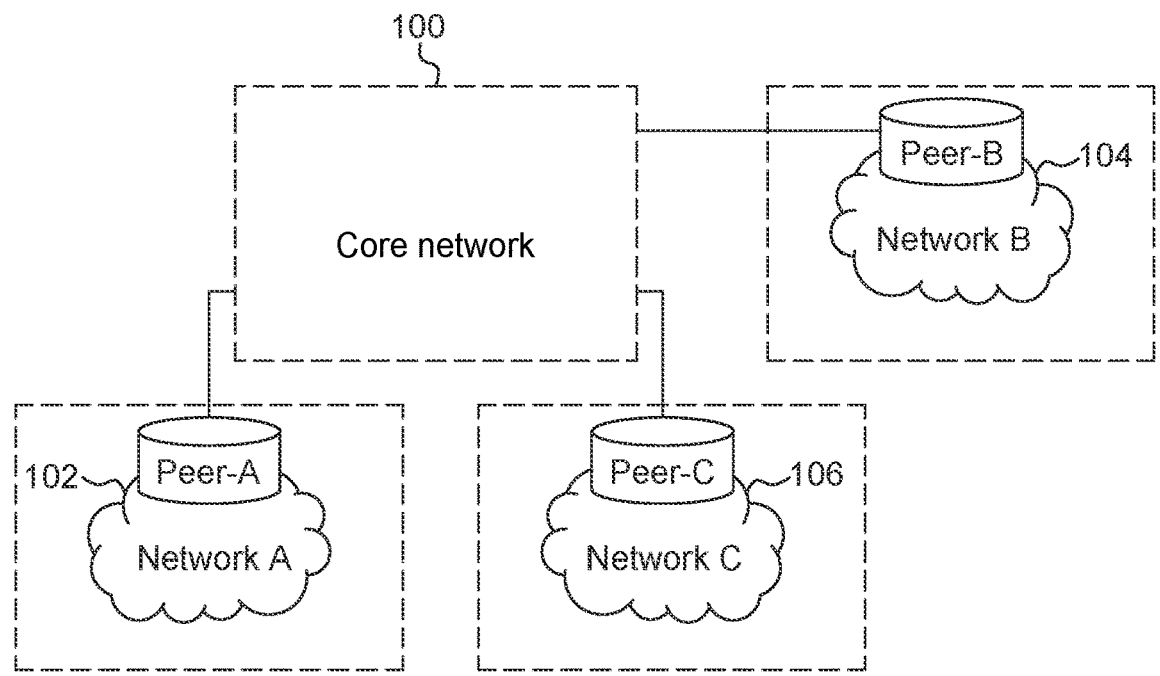
FIG. 1 illustrates an example operating environment in which bounded broadcast encryption key management may be implemented, in accordance with an embodiment.

The following detailed description is presented to enable any person skilled in the art to make and use the invention. For purposes of explanation, specific details are set forth to provide a thorough understanding of the present invention.

However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data via the established communication paths.

The "core network" may refer to a network infrastructure that may provide services to connect one or more networks with each other. In particular, a "core network" may represent a network owned, managed, and/or operated by a service provider (SP) to provide connectivity services to one or more customers in one or more networks. The core network represents a central or core element that provides one or more routing paths for exchange of information between different networks. The core network may facilitate high-capacity communication between different networks located at different geographical locations.

A "core node" may refer to any node within the core network, which is capable of routing packets to another core node within the core network. The core node may include, but not limited to an access point, a router, a bridge, a server, a gateway, a switch, a modem, a relay, or a hub.

In the core network, an "ingress core node" handles incoming data from another network. In the core network, an "egress core node" handles outgoing data to another network. An "intermediate core node" refers to a node between the ingress core node and the egress core node in the core network.

A "controller" may be for controlling and managing communication among network entities in a network.

"Encryption" may refer at least to the process of changing the "plaintext" into the "ciphertext". The encryption process may consist of at least an algorithm and a key. The key may be a value independent of the plaintext.

An "encryption key" may refer to a random string of bits created explicitly for scrambling and unscrambling data. Encryption keys may be designed with algorithms intended to ensure that every encryption key is unpredictable and unique. The longer the key built in this manner, the harder it is to crack the encryption code. An "encryption key" may be used to encrypt, decrypt, or carry out both functions.

A "peer-to-peer network" may refer to a group of devices linked together with equal permissions and responsibilities for processing data. Unlike traditional client-server networking, no devices in a peer-to-peer network are designated solely to serve or to receive data. Each connected device in a peer-to-peer network may have the same rights as its "peers" and may be used for the same purposes.

"Broadcasting" may refer to the simultaneous transmission of the same message to multiple recipients. In networking, broadcasting may occur when a packet transmitted by a network device is received by all other network devices connected (directly or indirectly) to the packet transmitter (i.e., to the network device transmitting the packet).

A "public key" may refer to an alphanumerical value that is used to encrypt data. The public key may be generated by a software program or may be provided by a trusted, designated authority. The public key may be made available to all nodes in a network through a publicly accessible repository or directory. A public key may be accompanied by a corresponding private key, which may be known only to its owner. Private keys may be used to decrypt messages that were created with the corresponding public key or to create signatures. In other words, a public key may lock up data from unauthorized use, while a private key may be used to unlock it. Usually, public-private keys will occur in a pair.

A "key seed" may refer to an initial key used to start an updating or key generation process.

A "secret key" may refer to a piece of information or a framework that is used to decrypt and encrypt messages. Each party to a communication that is intended to be private possesses a common secret key. Using the secret key, one party sends another party, a message transformed from its original (plaintext) into its encrypted form (ciphertext), and the other party reverses this process to reveal the original, and the process repeats.

A "nonce" may refer to an arbitrary (random) number that can be used just once in a cryptographic communication. It may often be a random or pseudo-random number issued in an authentication protocol to ensure that old communications cannot be reused in replay attacks. "Nonces" may also be useful as initialization vectors and in cryptographic hash functions.

A "key sequence number" may indicate an order of the keys (in an example, public keys) received at a peer in a peer-to-peer network. The ordering may be important to allow a peer (that receives the keys) to identify out-of-order reception of keys and respond accordingly. A peer may resend a key in such scenarios, in which case a previously used key sequence number would be reused. Further, the key sequence number may be associated with a counter, and the key sequence number may become larger every time a nonce or a public key changes.

A "Security Association" may refer to a simplex (one-way channel) and logical connection that provides a relationship between two or more systems to build a unique secure connection. A Security Association may be viewed as an agreement between two devices about how to protect information during transit. The Security Association are one way (simplex). If two devices, Dev 1 and Dev 2, are communicating using Internet Protocol security (IPsec), then Dev 1 will have two Security Association's; one Security Association, may be used for processing out-bound packets and the other Security Association may be used for processing inbound packets. A Security Association may include means to identify datagrams (in an example, by a security parameter index (SPI), and/or source (src)/destination (dst) addresses), and may further include keys and policies for protecting and identifying traffic.

A "security parameter index" may refer to an identifier used to uniquely identify both manually and dynamically established IPsec and/or other Security Associations. For manual Security Associations, the SPI may be configured by the customer. For dynamic Security Associations, the SPI may be generated by means of a key management protocol (example of which include Internet Key Exchange (IKE) mechanism(s), or Controller IKE mechanism(s), or the proposed mechanisms for bounded broadcast encryption key management).

A "crypto algorithm" may refer to a cryptographic algorithm that may be used for important tasks such as data encryption, authentication, and digital signatures.

"Decapsulation" may refer to the removal of all the additional information (associated with the originally existing data) and extraction of originally existing data. The process of "Decapsulation" may continue till the last layer i.e., the Application Layer. The process of "Decapsulation" removes, fragments of distinct information in each layer as it approaches that layer.

A "port" may refer to a physical or virtual point where network connections start and end. Ports may be hardware or software-based and may be managed by a computer's operating system. Each port may be associated with a specific process or service. Ports allow computers to differentiate between different kinds of traffic: emails go to a different port than webpages, for instance, even though both reach a computer over the same Internet connection. Further, a "public port" may refer to a port as seen from the Internet side, and a "private port" may refer to a port as being used by an application on a computer within the local network.

"Re-keying" may refer to a process of changing the encryption key of an ongoing communication in order to limit the amount of data encrypted with the same key. The encryption key may be changed after a pre-set volume of data has been transmitted or a given period of time has passed. In contemporary systems, re-keying may be implemented by forcing a new key exchange, typically through a separate protocol like IKE.

"Fragmentation" may refer to a process of breaking a message into smaller pieces (fragments), so that the resulting pieces can pass through a link with a smaller maximum transmission unit (MTU) than the original message. The fragments may be reassembled by the receiving host.

A "service provider" (SP) may refer to an entity providing, managing, and/or operating a core network, over which data is routed to and/or from one or more customers. Non-limiting examples of SPs may include Secure Access Service Edge (SASE) providers, Network as a Service (NaaS) providers, MPLS Virtual Private Network (VPN) providers, and SD-WAN providers.

In general, the core networks and the other networks may include any known network infrastructure in the context of telecommunication networks. In the spirit of the ongoing disclosure, such network infrastructure may at least include one or more nodes such as, but not limited to, access points, routers, bridges, servers, gateways, switches, modems, relays, and hubs. The other networks may include one or more of the above-mentioned nodes in addition to one or more peers, which are located within the premises of the networks.

An "endpoint device" may be any device associated with customers, individuals, or end users. The endpoint device may be a source node and/or a destination node to transmit and/or receive data packets from peers via the core network. In an embodiment, the source node may create and transmit the packets to the destination node, via an ingress node, core network, and an egress node. The endpoint device may include, but is not limited to, a computer, a personal digital assistant (PDA), a laptop, a cellular telephone, a tablet, or any other device or network element capable of initiating or exchanging data within one or more communication networks.

An "ingress node" may receive packet(s) originated from an endpoint device and perform encryption and/or encapsulation on the received packets to create encrypted and/or encapsulated packet(s). The ingress node may transmit the encrypted and/or encapsulated packet(s) towards an "egress node" via one or more core networks. The "egress node" may receive the encrypted and/or encapsulated packet(s) from a core network of the one or more core networks and transmit these packet(s) to an intended destination node. Further, each "node" or "peer" in this disclosure may include but is not limited to a gateway, a switch, a router, a set-top box, a receiver, a computer, a cell phone, a smart phone, a tablet, a PDA, and so on.

Furthermore, a "packet" refers to data or information that is packaged for transmission over a network. The packet created by the source node or ingress node may include a payload portion, a metadata portion, and one or more headers. In an embodiment, the metadata may include the one or more headers while in another alternative embodiment, the one or more headers in the packet may be partially or completely excluded from the metadata portion. The headers may include one or more of, but not limited to, an inner internet protocol (IP) header and an outer IP header. The payload portion may include data (e.g., customer related data) that the source node of a network may intend to transmit to the destination node of a network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

The disclosed approach facilitates decoupling secure transmission of data channel encryption keys (from one peer to another peer) required for key rotation from keys required to secure the control channel (between any two peers) itself. Using the disclosed approach, the keys used to secure the control channel may be refreshed using a broadcast mechanism, whereas the data channel keys may be rotated on a peer-to-peer basis. A further advantage offered by the disclosed approach is that the rotation schedules (of the data channel keys) may be individually decided (by a peer) and different algorithms may be used. Further, the disclosed approach ensures that encryption algorithm transforms for negotiation purposes are included in the combined broadcast/peer-to-peer nature of operation (between peers) to significantly simplify the negotiation of the parameters related to encryption algorithms between peers. Further, the disclosed approach facilitates distribution of variable size encryption key payloads in different environments: The distribution of presence and encryption initiation may take place in a variety of ways: using native multicast mechanisms, flooding mechanisms, post and pull mechanisms, or unicast. This may allow for the support of any size keys and usage of highly efficient distribution mechanisms adapted to specific networking and/or application environments. Further, encryption peer authentication may be separated into a separate protocol or built into the proposed packet exchanges between peers by means of the disclosed approach. Further, any encryption architecture that allows for the separation of control and data plane exchanges may take advantage of the disclosed approach for encryption key management.

To enable establishment of secure communication channels among any number of encryption peers in any network topology of communication, the disclosed approach utilizes at least a combination of broadcast-based discovery and initiation combined with: a key management protocol, peer-to-peer unicast for exchange of data channel encryption keys, and independent data channel key rotation. In one example, the disclosed approach involves "true broadcasts" (from one peer directly to a set of other peers), or "controlled broadcasts" (from a peer to a controller, which then re-distributes to other peers), or even "relay broadcast" (one peer sends to a set of peers, which may then forward on to a larger set of peers).

Further, unlike IKE or controller-IKE, the disclosed approach discusses a uni-directional key management protocol, meaning that it only establishes an IPsec Security Association in one direction. A two-way IPsec peering may become two independent one-way tunnels. The disclosed approach is based at least in part on the Key Encapsulation Mechanism (KEM) exchange model, rather than the commutative Diffie-Hellman key exchange mechanism. The KEM based mechanism may allow for integration of a greater number of cryptographic solutions.

The embodiments described herein provide a method, implemented in a peer-to-peer network for encryption key management. The method may include receiving, by a second peer, a first broadcast message from a first peer, the first broadcast message including at least a public key associated with the first peer. The method may further include generating, by the second peer, a key seed in response to receiving the first broadcast message. The method may furthermore include creating, by the second peer, a second message that includes the key seed encapsulated with the public key. The method may additionally include transmitting, by the second peer, the second message to the first peer, and in response to transmitting the second message, receiving, by the second peer, a packet from the first peer, the packet including data encrypted using a secret key derivable from the key seed and one or more portions of the second message.

In an embodiment, at least a portion of the second message may be transmitted in an IPsec payload.

In an embodiment, the method may further include determining, by the second peer, whether the first broadcast message is authentic. In an embodiment, generating the key seed may be based at least in part on determining whether the first broadcast message is authentic.

In an embodiment, determining whether the first broadcast message is authentic may include determining whether the first broadcast message is signed by the first peer. In an alternative embodiment, determining whether the first broadcast message is authentic may include determining whether the first broadcast message is received on a previously authenticated connection from a trusted third-party device.

In an embodiment, the second message may further include: a nonce assigned by the second peer for a relation with the first peer, a key sequence number of the first broadcast message, information to determine an inbound Security Association based on which, the data is to be received from the first peer. The inbound Security Association may include a security parameter index assigned by the second peer for a relation with the first peer, and a key sequence number assigned by the second peer for a relation with the first peer. In an embodiment, the inbound Security Association may be associated with the encapsulated key seed of the second message.

In an embodiment, the key seed may be sized to a cryptographic algorithm being used by the second peer. In an embodiment, the method may further include adding, by the second peer, fragmentation at least to the second message. In an embodiment, the method may further include re-keying, by the second peer, the secret key based at least in part on the public key.

In an embodiment, the packet may be received in a data plane. Further, in an embodiment, the reception of the packet may be an acknowledgement indicating that the second message was received by the first peer.

In an embodiment, the method may further include determining, by the second peer, a time period during which the second peer will use a same public key for encapsulation.

The embodiments described herein further provide a method, implemented in a peer-to-peer network for encryption key management. The method may include broadcasting, by a first peer, a first message at least to a second peer, the first message including at least a public key associated with the first peer. The method may further include receiving, by the first peer, a second message from the second peer, the second message including a key seed encapsulated with the public key, and the key seed being generated at the second peer. The method may furthermore include creating, by the first peer, an outbound Security Association based on which, data is to be transmitted to the second peer, where creating the outbound Security Association includes decapsulating the key seed based at least on the second message. The method may additionally include creating, by the first peer, a secret key based at least on the key seed and one or more portions of the second message, the secret key is for encrypting the data to be transmitted to the second peer, and transmitting, by the first peer, a packet to the second peer, the packet including the data encrypted using the secret key derivable from the key seed and one or more portions of the second message.

In an embodiment, decapsulating the key seed may include decapsulating the key seed using a private key available at the first peer. In an embodiment, the key seed is decapsulated using the private key in order to create the secret key.

In an embodiment, the method may further include determining, by the first peer, that the first peer intends to establish a secure communication with at least the second peer intending to communicate securely with the first peer, where broadcasting the first message may be based at least on determining that the first peer intends to establish the secure communication with at least the second peer.

In an embodiment, the first message may further include: a nonce assigned by the first peer for a relation with at least the second peer, a key sequence number assigned by the first peer for a relation with at least the second peer, a security parameter index assigned by the first peer for a relation with at least the second peer, and a public port for transmitting the data to the first peer from at least the second peer.

In an embodiment, the method may further include incrementing, by the first peer, the key sequence number in response to updating one or more portions of the first message.

In an embodiment, broadcasting the first message may include broadcasting the first message to a set of peers, the set of peers including at least the second peer.

Further, in an alternative embodiment, broadcasting the first message may include broadcasting the first message to a first set of peers which then re-distributes the first message at least to a second set of peers, the second set of peers including at least the second peer.

Furthermore, in an alternative embodiment, broadcasting the first message may include transmitting the first message to a controller which then relays the first message to at least the second peer.

In an embodiment, the packet may be transmitted in a data plane and on the outbound Security Association, to indicate to the second peer that the second message was received by the first peer.

In an embodiment, the method may further include determining, by the first peer, a time period during which a same public key is used for encapsulation of the key seed, and re-keying, by the first peer, the public key based at least in part on determining the time period.

In an embodiment, the method may further include avoiding, by the first peer, fragmentation at least to the first message.

In an embodiment, the second message may further include: a nonce assigned by the second peer for a relation with the first peer, a key sequence number of the first message, information to determine an inbound Security Association based on which, the data is to be received from the first peer, the inbound Security Association including a security parameter index assigned by the second peer for a relation with the first peer, and a key sequence number assigned by the second peer for a relation with the first peer. In an embodiment, the inbound Security Association may be associated with the encapsulated key seed of the second message.

The above-embodiments and other embodiments of the methods, apparatuses, and systems are described in more detail with reference to FIGS. 1-9.

FIG. 1 illustrates an example operating environment in which bounded broadcast encryption key management may be implemented, in accordance with an embodiment. The operating environment may include a core network 100 operated by an SP, a network (network A) 102, a network (network B) 104, and a network (network C) 106.

The core network 100 may provide connectivity services at least to network A, network B, and network C as depicted in FIG. 1. The core network 100 may include one or more core nodes. In an embodiment, the core network 100 by means of the one or more core nodes may route unicast and/or multicast traffic. Without departing from the scope of the ongoing disclosure, the core network 100 may be a segment routed MPLS network, an IPv4/IPv6 segment routed network, or a PCE based segment routed network. Further, the core network 100 may include a plurality of core networks (not depicted in the figures). Further, each of the plurality of core networks may include one or more core nodes.

Further, the core network 100 may communicate with network A 102 through at least one peer, such as Peer-A. In an embodiment, Peer-A may be an ingress node or an ingress customer premises equipment (CPE). Further, the core network 100 may communicate with network B 104 through at least one peer, such as Peer-B. In an embodiment, Peer-B may be an egress node or an egress CPE. Furthermore, the core network 100 may communicate with network C 106 through at least one peer, such as Peer-C. In an embodiment, Peer-C may be another egress node or another egress CPE. In an embodiment, the core network 100 may facilitate routing of data between remote locations, such as at least between two of networks A, B, and C.

In an embodiment, the core network 100 may use MPLS VPN service protocols for information exchange between the different networks (networks A, B, and C). Further, the core network may include a WAN, such as but not limited to an SD-WAN, and networks provided by internet service provider(s) (ISPs), managed service provider(s) (MSPs), NaaS providers, and SASE providers. Further, the core network 100 may interface with multiple networks such as, but not limited to, the Internet and a wireless network, e.g., a Long-Term Evolution (LTE) network.

Various networks located at different locations may need to be connected to each other via the core network 100 for external communication.

In an embodiment, the network (network A and/or network B and/or network C) may be a local area network (LAN), a WAN, or a private network.

Figure 2:
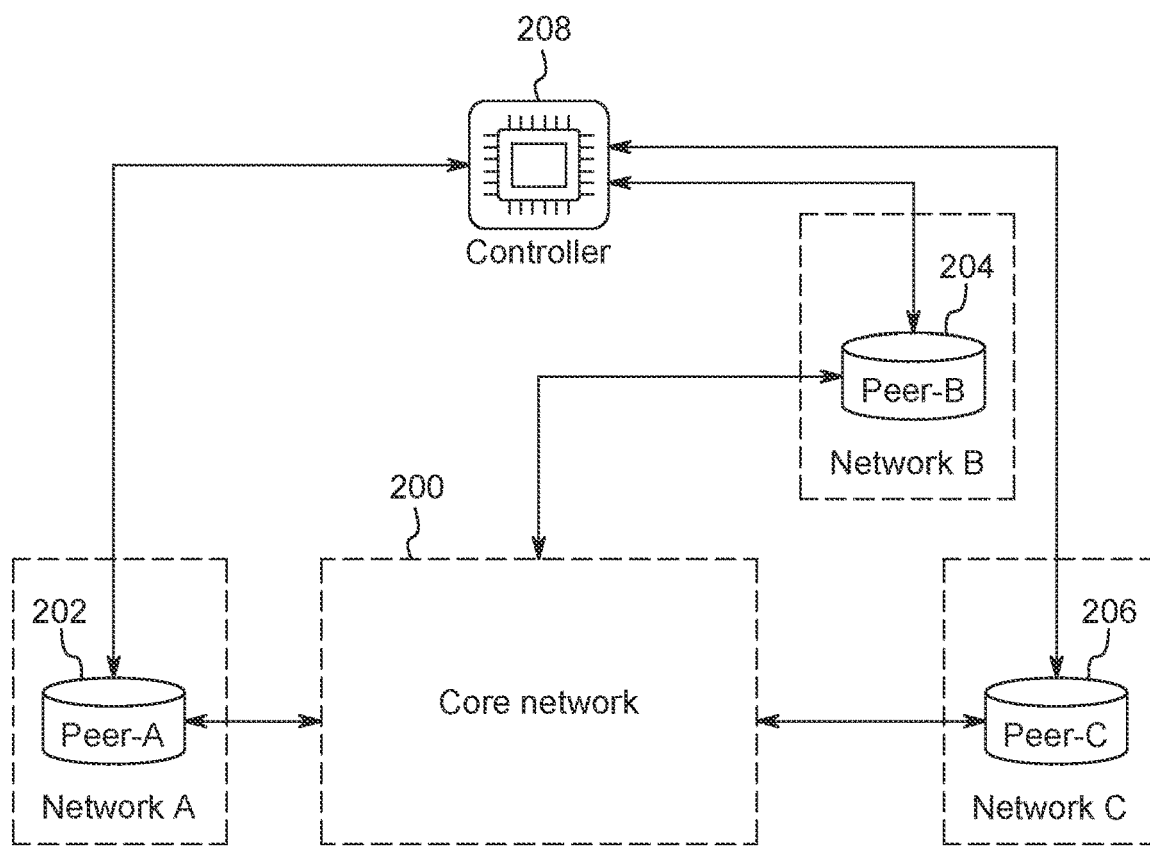
FIG. 2 illustrates another example operating environment in which bounded broadcast encryption key management may be implemented, in accordance with an embodiment.

FIG. 2 illustrates another example operating environment in which bounded broadcast encryption key management may be implemented, in accordance with an embodiment. FIG. 2 will be explained with reference to FIG. 1. As depicted in FIG. 2, the network topology may include a controller 208, one or more peers (e.g., Peer-A 202, Peer-B 204, and Peer-C 206), and one or more core nodes (not shown in FIG. 2) in the core network 200.

In an embodiment, the core network 200 may be implemented as a plain label switched network of nodes. In an embodiment, the core network 200 may not have any customer specific control plane information and does not have visibility into customer traffic encrypted by the CPEs. SPs (e.g., SASE, MPLS VPN, NaaS, and SD-WAN providers) usually own, manage, and/or operate a multi-tenant shared infrastructure.

In an embodiment, a packet may be routed from a source node to a destination node through Peer-A 202, one or more cores nodes of the core network 200, and Peer-B 204 and/or Peer-C 206.

Specifically, with reference to FIG. 2, the packet that may originate at the source node, such as an endpoint device, is received by the Peer-A 202. In an embodiment, the packet may be an Internet Protocol (IP) packet. Then, Peer-A 202 may perform encryption to generate an encrypted IP packet and transmit the encrypted IP packet to one or more core nodes of the core network 200. A person ordinary skilled in the art would understand that encryption may also include encapsulation and is not limited to only encryption of the data. Subsequently, the one or more core nodes of the core network 200 may forward the encrypted IP packet to Peer-B 204. Further, Peer-B 204 may decrypt the encrypted IP packet and route the decrypted IP packet to the destination node, such as an endpoint device communicatively coupled to Peer-B 204 and/or Peer-C 206. Further a person ordinary skilled in the art would understand that decryption may also include decapsulation and is not limited to only decryption of the data.

In an embodiment, there may be only one core node or a plurality of core nodes positioned (physically or logically) between Peer-A 202, and Peer-B 204 or Peer-C 206. A person skilled in the art would understand that the embodiments presented herein are not limited in any manner by the number of such core nodes and any number of core nodes may be present depending on design requirements.

In an embodiment, the controller 208 may be a dedicated controller for a customer, to facilitate communication between the peers during routing of packets between Peer-A 202, Peer-B 204, and Peer-C 206. Although the controller 208 is depicted as the dedicated controller in FIG. 2, however the controller 208 may be a multi-tenant controller for multiple customers and may be provided with segmentation between different customers. As a non-limiting example, the multi-tenant controller may include Multiprotocol-Border Gateway Protocol (MP-BGP) for MPLS VPN network. In an embodiment, authentication of the controller 208 may be performed based on certificates and/or configurations.

The controller 208 may control data plane and control plane of network elements, such as Peer-A 202, Peer-B 204, and Peer-C 206 in network A, network B, and network C, respectively. In some embodiments, the controller 208 may facilitate exchange of information, such as routing information, encryption related data, etc., between Peer-A 202, Peer-B 204, and Peer-C 206. In some embodiments, the controller 208 may monitor and/or access periodically at least one of local information and metadata that is stored or available at Peer-A 202, Peer-B 204, and Peer-C 206.

For secure communication of packets through a network, various encryption techniques defined by the IPsec or other known encryption standards may be implemented to encrypt the packets. For example, one or more encryption algorithms such as, but not limited to, Advanced Encryption Standard (AES) based encryption, Data Encryption Standard (DES)-based encryption, and Triple-DES based encryption may be used to encrypt a packet. Further, Encapsulating Security Payload (ESP) protocol is an IPsec encapsulation protocol, which uses at least AES based encryption, DES based encryption, and Triple-DES based encryption algorithms or other algorithms (known in the art). In an embodiment, the ESP protocol may be used to encrypt, encapsulate, and authenticate the packet that is communicated between the core network 200 and the networks A, B, and C. Additionally, the encryption herein, may also include one or more encapsulation techniques to encapsulate the packet to enhance security in the packet. For instance, the deployed encapsulation techniques may include, but not limited to a first layer of encapsulation and a second layer of encapsulation. In an embodiment, the first layer of encapsulation may be an end-to-end encapsulation. Further, in an embodiment, the second layer of encapsulation may be a hop-to-hop encapsulation, which may be decapsulated by each node along the routing path of the data packet to one or more of Peer-B 204 and Peer-C 206. Further, any of these encapsulation techniques may be used with any other encryption technique, without departing from the scope of the ongoing description.

Figure 3:
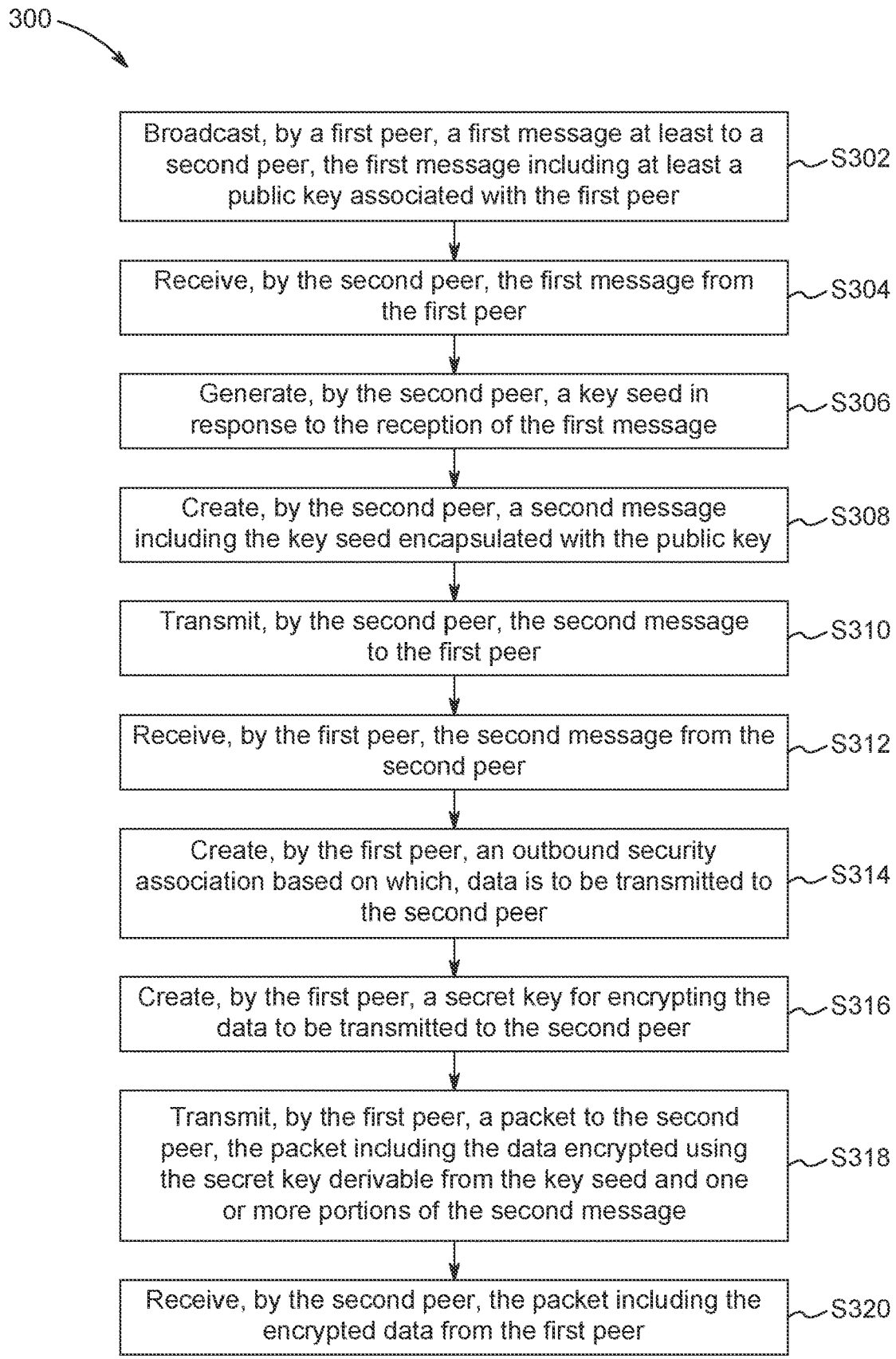
FIG. 3 illustrates an example flowchart describing a method, implemented in a peer-to-peer network, for encryption key management, in accordance with an embodiment.

FIG. 3 illustrates an example flowchart describing a method 300, implemented in a peer-to-peer network, for encryption key management, in accordance with an embodiment. The method 300 will be explained with reference to FIG. 1 and FIG. 2.

The method 300 may begin at step S302, where a first peer, such as Peer-A 202 illustrated in FIG. 2, included in a peer-to-peer network, may broadcast a first message at least to a second peer, such as Peer-B 204 illustrated in FIG. 2. In an embodiment, the first message may include at least a public key associated with the first peer. Further, in an embodiment, the public key associated with the first peer may be authenticatable.

In an embodiment, broadcasting the first message may include broadcasting the first message to a set of peers (e.g., including at least the second peer). In an alternative embodiment, broadcasting the first message may include broadcasting the first message to a first set of peers which then, re-distributes the first message to a second set of peers. Here, the second set of peers may include at least the second peer. Further, in an alternative embodiment, broadcasting the first message may include transmitting the first message to a controller which then relays the first message to at least the second peer. In an embodiment, the controller may be an "in-band" controller or an "off-path" controller.

Furthermore, in an embodiment, the first peer may determine that it intends to establish a secure communication with at least the second peer intending to communicate securely with the first peer. In such a scenario, the broadcasting of the first message (as discussed above) may be based at least on determining that the first peer intends to establish the secure communication with at least the second peer.

In an embodiment, the first message may include a nonce assigned by the first peer for a relation with at least the second peer, a key sequence number assigned by the first peer for a relation with at least the second peer, a security parameter index assigned by the first peer for a relation with at least the second peer, and a public port for transmitting data to the first peer from at least the second peer. Further, in an embodiment, the size of the nonce may be chosen based on a desired level of security (required in the network(s) including the first peer and/or the second peer) and cryptographic algorithms in use (in the network(s) including the first peer and/or the second peer). Furthermore, in an embodiment, the security parameter index may include an identifier chosen to allow a sender (of a message) to properly identify responses. In the case of a security parameter index being included in the first message, the security parameter index may allow the first peer to more accurately identify second message(s) (received from the second peer). Further, a security parameter index included in a second message (transmitted from the second peer) may allow the second peer to identify subsequent packets received at the second peer.

In an embodiment, the key sequence number may be incremented by the first peer in response to updating one or more portions of the first message. This is because, due to the nature of broadcasting (of the first message), and/or redundant controller(s) (that may be used in the propagation of the first message), and/or relaying of the first message, there is a likelihood of out-of-order messages from Peer-A 202 (to the other peers) and also a certainty of duplication in the transmissions. Thus, Peer-A 202 must increment its key sequence number whenever Peer-A 202 updates any portion of the first message, and all other peers must only act on messages with a larger key sequence number than previously received. Thus, there is a technical aspect tied to the key sequence number getting incremented by the first peer (i.e., Peer-A 202) in response to updating one or more portions of the first message. Further, in an embodiment, the updating of one or more portions of the first message may include re-keying (the public key). Thus, in an embodiment, when the public key and/or the nonce (included in the first message) are updated, then the key sequence number may be incremented.

Subsequently, in step S304, the second peer may receive the first message from the first peer.

Then, in step S306, the second peer may generate a key seed in response to the reception of the first message. In an embodiment, the second peer may determine whether the first message is authentic before generating the key seed. In such a scenario, generating the key seed may be based at least in part on determining whether the first message is authentic.

In an embodiment, the second peer may determine whether the first message is authentic by determining whether the first broadcast message is signed by the first peer. To determine whether the first broadcast message is signed by the first peer, the second peer may utilize a digital signature. In an embodiment, the contents of the first message may be signed by the first peer using a private key for which the first peer has a certificate (including the corresponding public key) which can be validated by the second peer. Further, the public key included in the first message is different from the public key included in the certificate (that is available with the first peer).

Further, in an alternative embodiment, the second peer may determine whether the first message is authentic by determining whether the first message is received on a previously authenticated connection from a trusted third-party device. In an embodiment, the trusted third-party device may be the controller 208 as depicted in FIG. 2.

In an embodiment, the key seed may be sized to a cryptographic algorithm being used by the second peer. In an embodiment, the cryptographic algorithm may be selected based at least on the KEM algorithm associated with the public key in the first message. The cryptographic algorithm may have to be large enough to allow for the creation of a key for the chosen encryption algorithm.

Subsequently, in step S308, the second peer may create a second message including the key seed encapsulated with the public key. In an embodiment, the second message may further include a nonce assigned by the second peer for a relation with the first peer, a key sequence number of the first message, information to determine an inbound Security Association based on which, the data is to be received from the first peer, and a key sequence number assigned by the second peer for a relation with the first peer. In an embodiment, the inbound Security Association may be associated with the encapsulated key seed of the second message. Further, in an embodiment, the second peer may add fragmentation at least to the second message.

In an embodiment, the inbound Security Association may include a security parameter index assigned by the second peer for a relation with the first peer. In an embodiment, the inbound Security Association may further include a secret key generated using a key derivation function (KDF) with parameters such as the nonce assigned by the first peer for a relation with at least the second peer, the nonce assigned by the second peer for a relation with the first peer, the key sequence number assigned by the first peer for a relation with at least the second peer, the key sequence number assigned by the second peer for a relation with the first peer, and the key seed.

Then, in step S310, the second peer may transmit the second message to the first peer. In an embodiment, at least a portion of the second message is transmitted in an IPsec payload.

Subsequently, in step S312, the first peer may receive the second message from the second peer.

Then, in step S314, the first peer may create an outbound Security Association based on which, the data is to be transmitted to the second peer. In an embodiment, the first peer may create the outbound Security Association by decapsulating the key seed based at least on the second message. In an embodiment, the first peer may decapsulate the key seed using a private key available at the first peer. In an embodiment, the key seed is decapsulated using the private key in order to create the secret key.

Next, in step S316, the first peer may create a secret key for encrypting the data to be transmitted to the second peer. In an embodiment, the secret key may be created using a KDF having parameters as the nonce assigned by the first peer for a relation with at least the second peer, the nonce assigned by the second peer for a relation with the first peer, the key sequence number assigned by the first peer for a relation with at least the second peer, the key sequence number assigned by the second peer for a relation with the first peer, and the key seed. Further, in an embodiment, the outbound Security Association may have the secret key (discussed above) and a same security parameter index as that of the inbound Security Association. This security parameter index is assigned by the second peer for a relation with the first peer.

Then, in step S318, the first peer may transmit a packet to the second peer. The packet may include the data encrypted using the secret key derivable from the key seed and one or more portions of the second message. The one or more portions of the second message may include at least the nonce assigned by the first peer for a relation with at least the second peer, the nonce assigned by the second peer for a relation with the first peer, the key sequence number assigned by the first peer for a relation with at least the second peer, and the key sequence number assigned by the second peer for a relation with the first peer. In an embodiment, the packet may be transmitted in a data plane and on the outbound Security Association (created by the first peer), to indicate to the second peer that the second message was received by the first peer.

Subsequently, in step S320, the second peer may receive the packet including the encrypted data from the first peer. The reception of the packet may be an acknowledgement indicating that the second message was received by the first peer. Receiving the packet including the encrypted data by the second peer from the first peer indicates successful transmission of data from the first peer to the second peer. Further, in a scenario where the first peer transmits the packet to the second peer and the second peer does not detect the reception of the packet, then the second peer may retransmit the second message.

Figure 4:
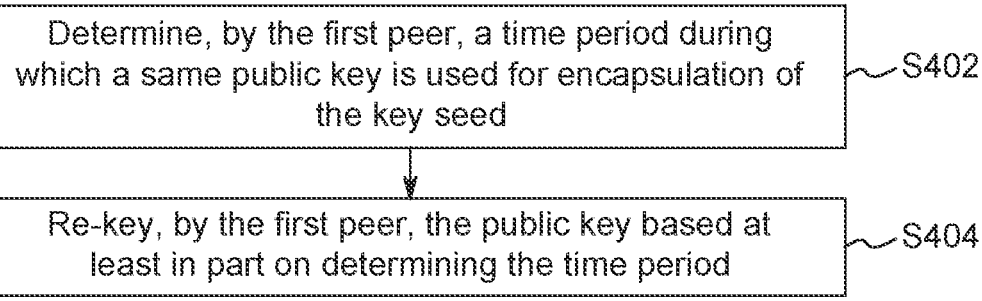
FIG. 4 illustrates an example flowchart describing a method, implemented in a peer-to-peer network, for re-keying a public key, in accordance with an embodiment.
Figure 5:
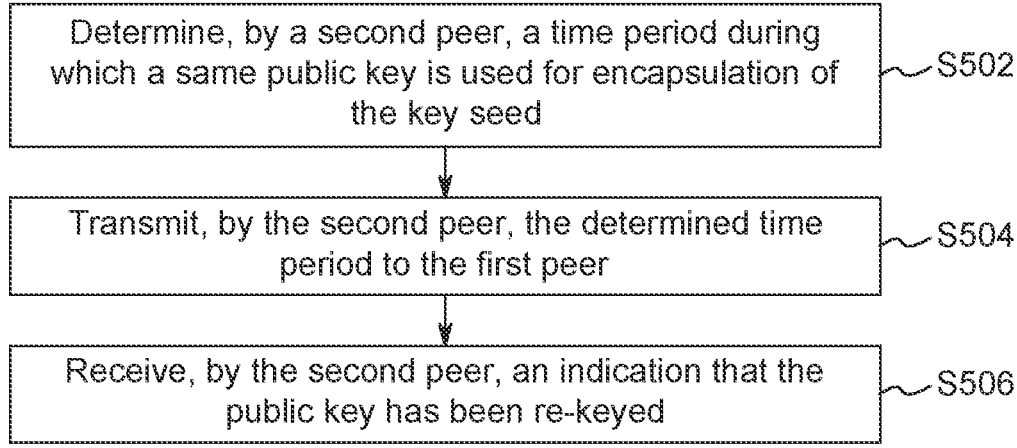
FIG. 5 illustrates another example flowchart describing a method, implemented in a peer-to-peer network, for re-keying a public key, in accordance with an embodiment.

FIG. 4 and FIG. 5 illustrate example flowcharts describing methods 400 and 500, implemented in a peer-to-peer network, for re-keying a public key, in accordance with two embodiments. Re-keying may be used to change the public key of an ongoing communication in order to limit the amount of data encrypted with the same public key. In the present disclosure, re-keying may be done by any of the peers (i.e., by Peer-A 202, or Peer-B 204 or Peer-C 206), but only Peer-A 202 may re-key the public key. The disclosed approach may also be intended to employ re-use of public keys. Accordingly, re-keying both with and without public key re-use, may be realizable, in various embodiments of the present disclosure. Further, while only Peer-A 202 may re-key its public key, Peer-B 204 and/or Peer-C 206 may enforce their own policy on how long they would continue to use a single public key derived from Peer-A 202. While re-keying the public key may be important, it may also be expensive. Accordingly, significant benefit may be derived from re-keying the secret key while re-using the public key. Thus, in an embodiment, Peer-B 204 and/or Peer-C 206 saves: the public key obtained from Peer-A 202, the key seed derived by themselves, and the key seed encapsulated with the public key obtained from Peer-A 202. Then, if Peer-A 202 re-keys and re-uses the same public key (sent in a previous communication to Peer-B 204 and/or Peer-C 206), Peer-B 204 and/or Peer-C 206 may re-key the secret key with only the computational cost of the KDF and avoid public key encryption. This is because Peer-B 204 and/or Peer-C 206 are already in possession of the public key (which has not changed). The above process provides a significant advantage for peers or nodes having a large number of encryption peers or low power nodes, such as Internet of Things (IoT) peers or nodes.

In an embodiment, Peer-B 204 may re-key the secret key even if Peer-A 202 does not re-key (the public key) at all. In an alternative or additional embodiment, Peer-C 206 may re-key the secret key even if Peer-A 202 does not re-key (the public key) at all. In such a scenario, Peer-B 204 and/or Peer-C 206 may just simply need to update associated nonces, associated security parameter indices, and associated key sequence numbers (which Peer-B 204 and/or Peer-C 206 must do anyway when Peer-A 202 re-keys either with or without a public key re-key).

It may be advantageous that Peer-B 204 and/or Peer-C 206 initiate a re-key of the secret key without needing a re-key of the public key. An example of Peer-B 204 initiating a re-key of the secret key without needing a re-key of the public key is described through an example flowchart of FIG. 8B.

FIG. 4 illustrates an example flowchart describing a method 400, implemented in a peer-to-peer network, for re-keying a public key, in accordance with an embodiment. In an embodiment, these steps may be implemented in a first peer, such as Peer-A 202 illustrated in FIG. 2, included in the peer-to-peer network. Further, in an embodiment, FIG. 4 may be implemented after step S320 of FIG. 3.

In step S402, the first peer may determine a time period during which a same public key is used for encapsulation of the key seed. The time period may typically be determined using one or both of the two methods discussed below. The first method may include determining the time period by an administrator (e.g., an implementer of the peer-to-peer network) and approved by a user of the peer-to-peer network. In an embodiment, the time period determined using the first method may be set to 24 hours. This determination (using the first method) may typically be subject to re-configuration in a customer-facing implementation. The second method may be based on existing science on how much data should be transferred using a single public key before an amount of data samples provides enough data to ease the process of uncovering the public key using brute force.

Then, in step S404, the first peer may re-key the public key based at least in part on determining the time period. Re-keying of the public key may be performed in order to limit an amount of data encrypted with the same public key. In an example, re-keying is to be performed before an amount of data samples provides enough data to ease the process of uncovering the public key using brute force.

FIG. 5 illustrates another example flowchart describing a method 500, implemented in a peer-to-peer network, for re-keying a public key, in accordance with an embodiment. In an embodiment, these steps may be implemented in a second peer, such as Peer-B 204 or Peer-C 206 illustrated in FIG. 2, included in the peer-to-peer network. Further, in an embodiment, FIG. 5 may be implemented after step S320 of FIG. 3.

In step S502, the second peer may determine a time period during which a same public key is used for encapsulation of the key seed.

Then, in step S504, the second peer may transmit the determined time period to the first peer.

Subsequently, in step S506, the second peer may receive an indication that the public key has been re-keyed. In an embodiment, the first peer may take into consideration the determined time period transmitted by the second peer to the first peer.

FIG. 6A illustrates an example flowchart describing a method 600, implemented in a peer-to-peer network, for avoiding fragmentation to a message, in accordance with an embodiment. In an embodiment, step S602 of method 600 may be implemented in a first peer, such as Peer-A 202 illustrated in FIG. 2, included in the peer-to-peer network, when fragmentation to the first message is to be avoided. In an embodiment, FIG. 6A may be implemented before step S302 or in parallel with step S302 of FIG. 3.

With regards to FIG. 6A, in step S602, the first peer (Peer-A 202) may avoid fragmentation at least to the first message (generated at Peer-A 202). This is because the public keys may include substantially large keys of algorithms (such as post quantum (PQ) encryption methods), and may be associated with PQ encryption methods. In such a scenario, due to the very large keys of algorithms (such as PQ encryption methods) and the other PQ encryption methods, the first message may become too large to fit into a single datagram. For the first message, this problem may be solved by avoiding fragmentation of the first message. This may be done by allowing for sending a Uniform Resource Locator (URL) for the public key instead of public key itself. It may be resource efficient to broadcast small payloads especially if there are several public key types (for negotiation between various peers). Only peers wishing to communicate with Peer-A 202 need to download Peer-A's 202 public key (and only one public key type). The URL may be sourced at Peer-A 202 itself, or on a third-party device that Peer-A 202 delivered the public key to. A "wildcard" URL may be allowed so that Peer-A 202 may specify a range of hosts that can provide the public key. Further, the URL itself may be changed only when Peer-A 202 re-keys the public key.

FIG. 6B illustrates an example flowchart describing a method 600', implemented in a peer-to-peer network, for adding fragmentation to a message, in accordance with an embodiment. In an embodiment, step S602' of method 600' may be implemented in a second peer, such as Peer-B 204 illustrated in FIG. 2, included in the peer-to-peer network, when fragmentation to the second message is to be added. In an embodiment, FIG. 6B may be implemented before step S310 or in parallel with step S310 of FIG. 3. In an embodiment, fragmentation may be an optional step that may be implemented before step S310 or in parallel with step S310 of FIG. 3.

With regards to FIG. 6B, in step S602', the second peer (Peer-B 204) may add fragmentation at least to the second message (generated at Peer-B 204). As discussed above, the public keys may include substantially large keys of algorithms (such as PQ encryption methods), and may be associated with PQ encryption methods. In such a scenario, due to the very large keys of algorithms (such as PQ encryption methods) and the other PQ encryption methods, the second message may become too large to fit into a single datagram. Further, in an embodiment and as discussed above, fragmentation may be an optional step that may be implemented before step S310 or in parallel with step S310 of FIG. 3. In an embodiment, fragmentation may be added based at least in part on one or more of encryption algorithms and encryption methods used at the second peer (Peer-B 204). In an example, fragmentation may be added at least when the public keys include substantially large keys of algorithms (such as PQ encryption methods), and/or may be associated with PQ encryption methods. For the second message, fragmentation (and/or reassembly) may be added to the second message using IPsec Encapsulating Security Payload (ESP) header/payload. If a particular number of the most significant bits of the sequence number of the second message are set, then those upper particular number of bits may indicate the total number of fragments. All fragments of a given second message must have the same upper particular number of bits, and the lower particular number of bits indicate which fragment it is (i.e., the actual sequence number). In an example, in IPsec, if any of the most significant 16 bits of the sequence number of the second message are set, then those upper 16 bits may indicate the total number of fragments. Further, all fragments of a given second message must have the same upper 16 bits, and the lower 16 bits indicate which fragment it is (i.e., the actual sequence number). Further, integrity checking for the second message may only be done when all fragments are reassembled. Implementations must protect against Denial-of-Service (DOS) attacks with forged fragments. Further, a lack of receipt of specific fragments may be signaled to Peer-B 204 by the concerned peers. Otherwise, Peer-B 204 must resend the entire set of fragments. Peer-B 204 might be made aware of the need for resending the full second message if it receives no security parameter index traffic from Peer-A 202

In an embodiment, fragmentation may be avoided (by Peer-A 202) to one or more messages generated at Peer-A 202 (FIG. 6A); and in an additional or alternative embodiment, fragmentation may be added (by Peer-B 204 and/or Peer-C 206) to one or more messages generated at Peer-B 204 and/or Peer-C 206 (FIG. 6B).

Figure 7:
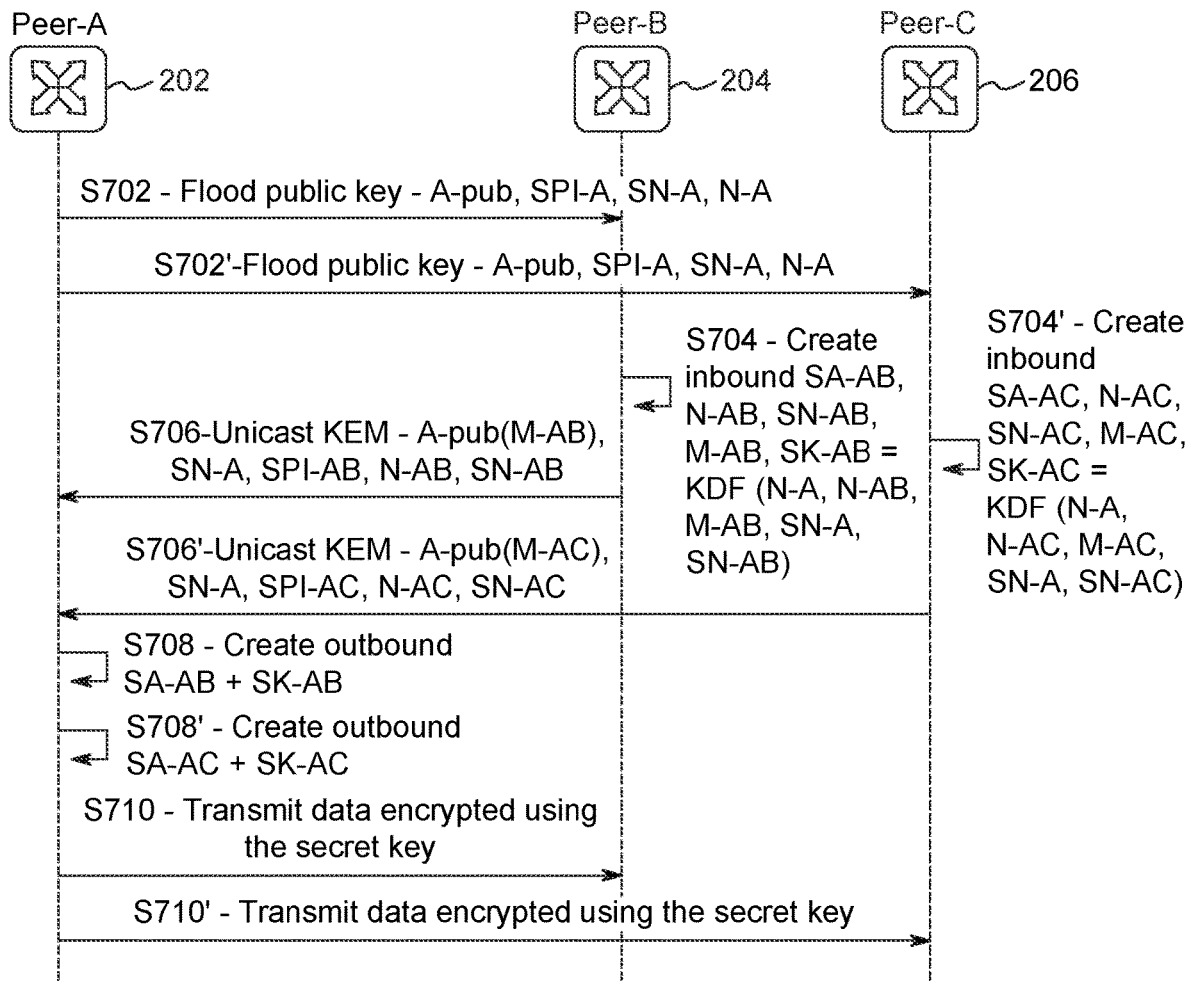
FIG. 7 illustrates a signal flow graph diagram indicating a method for initial key exchange for encryption key management, in accordance with an embodiment.

FIG. 7 illustrates a signal flow graph diagram indicating a method for initial key exchange for encryption key management, in accordance with an embodiment. In an embodiment, FIG. 7 includes one or more steps that are similar to the one or more steps of FIG. 3.

In steps S702 and S702', Peer-A 202 may broadcast (flood) a first message at least to Peer-B 204 and Peer-C 206. In an embodiment, both steps S702 and S702' of FIG. 7 may be similar to step S302 of FIG. 3. In an embodiment, the first message may include at least a public key (A-pub) associated with Peer-A 202. In an embodiment, the first message may further include a nonce (N-A) assigned by Peer-A 202 for a relation with at least Peer-B 204 and Peer-C 206, a key sequence number (SN-A) assigned by Peer-A 202 for a relation with at least Peer-B 204 and Peer-C 206, a security parameter index (SPI-A) assigned by Peer-A 202 for a relation with at least Peer-B 204 and Peer-C 206, and a public port for transmitting data to Peer-A 202 at least from Peer-B 204 and Peer-C 206. In an embodiment, the public port may be used to transmit the second message to Peer-A 202 from Peer-B 204 as discussed above.

Next, in step S704, Peer-B 204 may create a second message that may at least include a key seed (M-AB) encapsulated with the public key (A-pub). In an embodiment, step S704 of FIG. 7 may be similar to step S308 of FIG. 3. In an embodiment, the second message (created by Peer-B 204) may further include at least a nonce (N-AB) assigned by Peer-B 204 for a relation with Peer-A 202, and information for determining an inbound Security Association (Inbound SA-AB) based on which, data is to be received from Peer-A 202 by Peer-B 204. In an embodiment, the inbound Security Association (Inbound SA-AB) may include a security parameter index assigned by Peer-B 204 for a relation with Peer-A 202. In an embodiment, the inbound Security Association (Inbound SA-AB) may include a secret key generated using a KDF with parameters as the nonce (N-A) assigned by Peer-A 202 for a relation with at least Peer-B 204 and Peer-C 206, the nonce (N-AB) assigned by Peer-B 204 for a relation with Peer-A 202, the key sequence number (SN-A) assigned by Peer-A 202 for a relation with at least Peer-B 204 and Peer-C 206, the key sequence number (SN-AB) assigned by Peer-B 204 for a relation with Peer-A 202, and the key seed (M-AB) generated by Peer-B 204.

Further, in step S704', Peer-C 206 may create a second message that may at least include a key seed (M-AC) encapsulated with the public key (A-pub). In an embodiment, step S704' of FIG. 7 may be implemented after step S308, before step S308, or in parallel with step S308 of FIG. 3. In an embodiment, the second message (created by Peer-C 206) may further at least include a nonce (N-AC) assigned by Peer-C 206 for a relation with Peer-A 202, and information for determining an inbound Security Association (Inbound SA-AC) based on which, data is to be received from Peer-A 202 by Peer-C 206. In an embodiment, the inbound Security Association (Inbound SA-AC) may include a security parameter index assigned by Peer-C 206 for a relation with Peer-A 202. In an embodiment, the inbound Security Association (Inbound SA-AC) may include a secret key generated using a KDF with parameters as the nonce (N-A) assigned by Peer-A 202 for a relation with at least Peer-C 206 and Peer-B 204, the nonce (N-AC) assigned by Peer-C 206 for a relation with Peer-A 202, the key sequence number (SN-A) assigned by Peer-A 202 for a relation with at least Peer-C 206 and Peer-B 204, the key sequence number (SN-AC) assigned by Peer-C 206 for a relation with Peer-A 202, and the key seed (M-AC) generated by Peer-C 206.

Next, in step S706, Peer-B 204 may transmit (using unicast communication), the second message (created by Peer-B 204) to Peer-A 202. Further, in an embodiment, step S706 of FIG. 7 may be similar to step S310 of FIG. 3. Similarly, in step S706', Peer-C 206 may transmit (using unicast communication), the second message (created by Peer-C 206) to Peer-A 202. In an embodiment, step S706' of FIG. 7 may be implemented after step S310 or in parallel with step S310 of FIG. 3.

Next, in step S708, Peer-A 202 may create an outbound Security Association (Outbound SA-AB) based on which, data is to be transmitted to Peer-B 204. In an embodiment, step S708 of FIG. 7 may be similar to step S314 of FIG. 3. In an embodiment, Peer-A 202 may create the outbound Security Association (Outbound SA-AB) by decapsulating the key seed (M-AB) based at least on the second message (created by Peer-B 204). In an embodiment, Peer-A 202 may decapsulate the key seed (M-AB) using a private key available at Peer-A 202. In an embodiment, the key seed (M-AB) is decapsulated using the private key in order to create a secret key (SK-AB). Further, in step S708, Peer-A 202 may create the secret key (SK-AB) for encrypting the data to be transmitted to Peer-B 204. In an embodiment, the secret key (SK-AB) may be created using a KDF having parameters as the nonce (N-A) assigned by Peer-A 202 for a relation with at least Peer-B 204 and Peer-C 206, the nonce (N-AB) assigned by Peer-B 204 for a relation with Peer-A 202, the key sequence number (SN-A) assigned by Peer-A 202 for a relation with at least Peer-B 204 and Peer-C 206, the key sequence number (SN-AB) assigned by Peer-B 204 for a relation with Peer-A 202, and the key seed (M-AB) generated by Peer-B 204. Further, in an embodiment, the outbound Security Association (Outbound SA-AB) may have the secret key (SK-AB as discussed above) and a same security parameter index as that of the inbound Security Association (Inbound SA-AB, as discussed above). This security parameter index is assigned by Peer-B 204 for a relation with Peer-A 202.

Next, in step S708', Peer-A 202 may create an outbound Security Association (Outbound SA-AC) based on which, data is to be transmitted to Peer-C 206. In an embodiment, step S708' of FIG. 7 may be implemented after step S314 or in parallel with step S314 of FIG. 3. In an embodiment, Peer-A 202 may create the outbound Security Association (Outbound SA-AC) by decapsulating the key seed (M-AC) based at least on the second message (created by Peer-C 206). In an embodiment, Peer-A 202 may decapsulate the key seed (M-AC) using a private key available at Peer-A 202. In an embodiment, the key seed (M-AC) is decapsulated using the private key in order to generate a secret key (SK-AC). Further, in step S708', Peer-A 202 may create the secret key (SK-AC) for encrypting the data to be transmitted to Peer-C 206. In an embodiment, the secret key (SK-AC) may be created using a KDF having parameters as the nonce (N-A) assigned by Peer-A 202 for a relation with at least Peer-C 206 and Peer-B 204, the nonce (N-AC) assigned by Peer-C 206 for a relation with Peer-A 202, the key sequence number (SN-A) assigned by Peer-A 202 for a relation with at least Peer-C 206 and Peer-B 204, the key sequence number (SN-AC) assigned by Peer-C 206 for a relation with Peer-A 202, and the key seed (M-AC) generated by Peer-C 206. Further, in an embodiment, the outbound Security Association (Outbound SA-AC) may have the secret key (SK-AC, as discussed above) and a same security parameter index as that of the inbound Security Association (Inbound SA-AC, as discussed above). This security parameter index is assigned by Peer-C 206 for a relation with Peer-A 202.

Subsequently, in step S710, Peer-A 202 may transmit the data encrypted using the secret key (SK-AB) associated with Peer-B 204, to Peer-B 204. In an embodiment, step S710 of FIG. 7 may be similar to step S318 of FIG. 3. Further, in step S710', Peer-A 202 may transmit the data encrypted using the secret key (SK-AC) associated with Peer-C 206, to Peer-C 206. In an embodiment, step S710' of FIG. 7 may be implemented after step S318, before step S318, or in parallel with step S318 of FIG. 3.

Figure 8A:
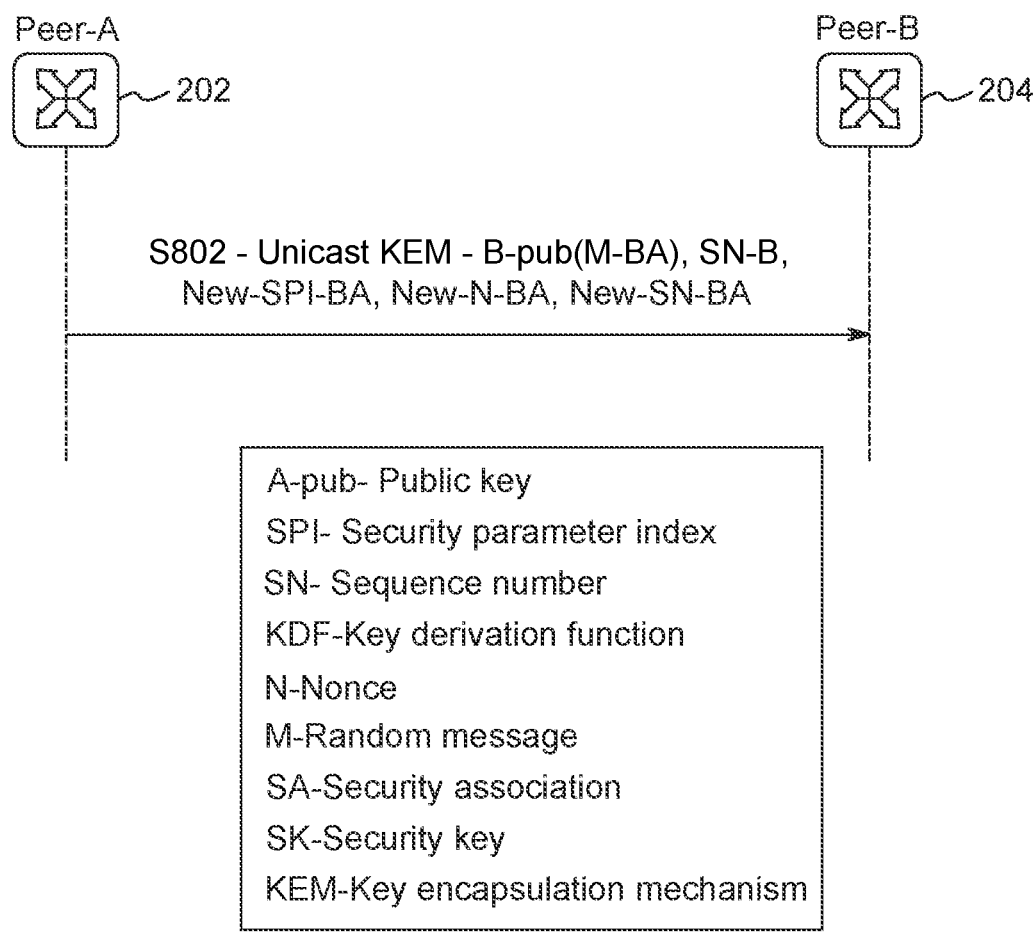
FIGS. 8A and 8B illustrate signal flow graph diagrams indicating methods for secret key rotation, in accordance with an embodiment.
Figure 8B:
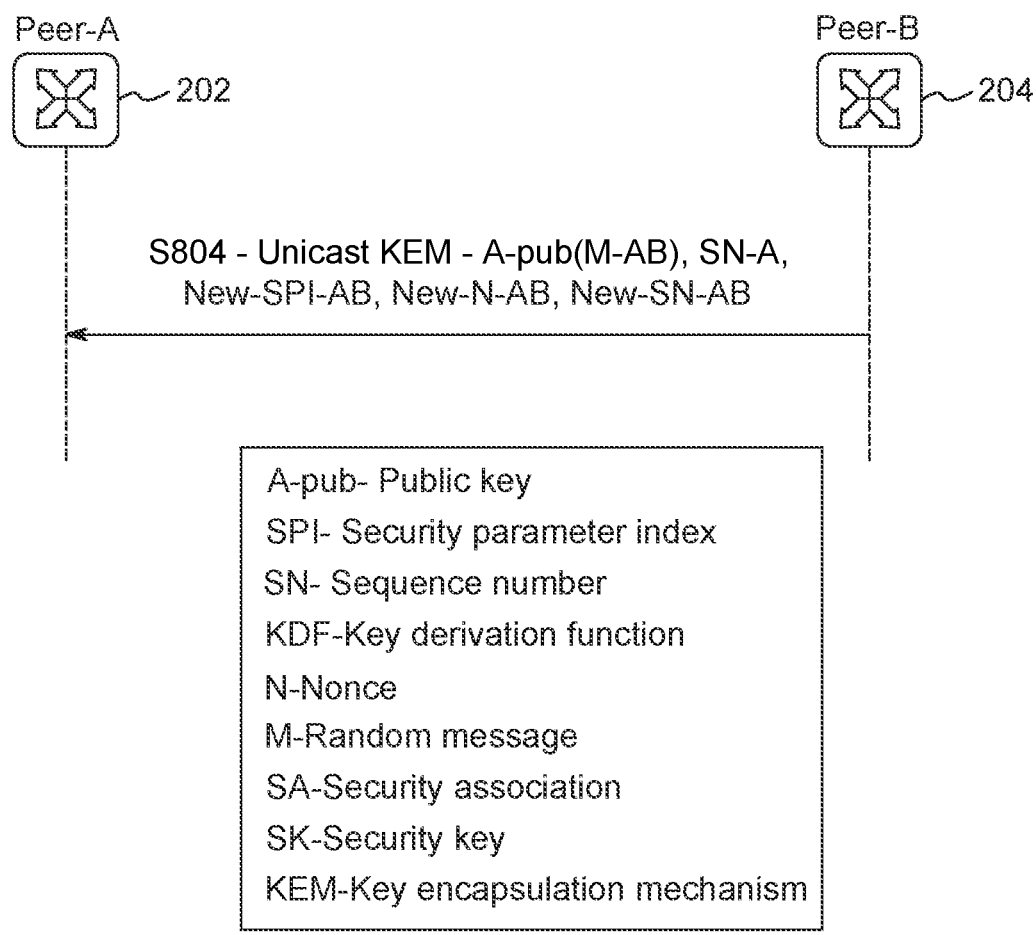

FIGS. 8A and 8B illustrate signal flow graph diagrams indicating methods for secret key rotation, in accordance with an embodiment. In an embodiment, the step S802 of FIG. 8A may be implemented after step S320 of FIG. 3 or at any time after step S310 of FIG. 3. Further, in an embodiment, the step S804 of FIG. 8B may be implemented after step S320 of FIG. 3 or at any time after step S310 of FIG. 3.

With reference to FIG. 8A, in step S802, Peer-A 202 may transmit a message using unicast communication to Peer-B 204. In an embodiment, the transmitted message may include at least a key seed (M-BA, generated by Peer-A 202) encapsulated with a public key (B-pub) associated with Peer-B 204, a key sequence number (SN-B) assigned by Peer-B 204 for a relation with at least Peer-A 202, a new security parameter index (New-SPI-BA) assigned by Peer-A 202 for a relation with at least Peer-B 204, a new nonce (New-N-BA) assigned by Peer-A 202 for a relation with at least Peer-B 204, and a new key sequence number (New-SN-BA) assigned by Peer-A 202 for a relation with at least Peer-B 204. The purpose of step S802 of FIG. 8A is to re-key the secret key (SK-BA) that has been discussed above.

Next, with reference to FIG. 8B, in step S804, Peer-B 204 may transmit a message using unicast communication to Peer-A 202. In an embodiment, this transmitted message may include at least a key seed (M-AB, generated by Peer-B 204) encapsulated with a public key (A-pub) associated with Peer-A 202, a key sequence number (SN-A) assigned by Peer-A 202 for a relation with at least Peer-B 204, a new security parameter index (New-SPI-AB) assigned by Peer-B 204 for a relation with at least Peer-A 202, a new nonce (New-N-AB) assigned by Peer-B 204 for a relation with at least Peer-A 202, and a new key sequence number (New-SN-AB) assigned by Peer-B 204 for a relation with at least Peer-A 202. The purpose of step S804 of FIG. 8B is to re-key the secret key (SK-AB) that has been discussed above.

In an embodiment, step S802 discussed by means of FIG. 8A is identical to step S804 of FIG. 8B but in the opposite direction. Further, step S802 and step S804 are completely independent of one another. In other words, one step (i.e., S802 or S804) is not a response to the other step (i.e., S804 or S802). Further, in an embodiment, step S802 and step S804 may occur in either order. Further, in an embodiment, one step (i.e., S802 or S804) may occur without the other step (i.e., S804 or S802).

Figure 9:
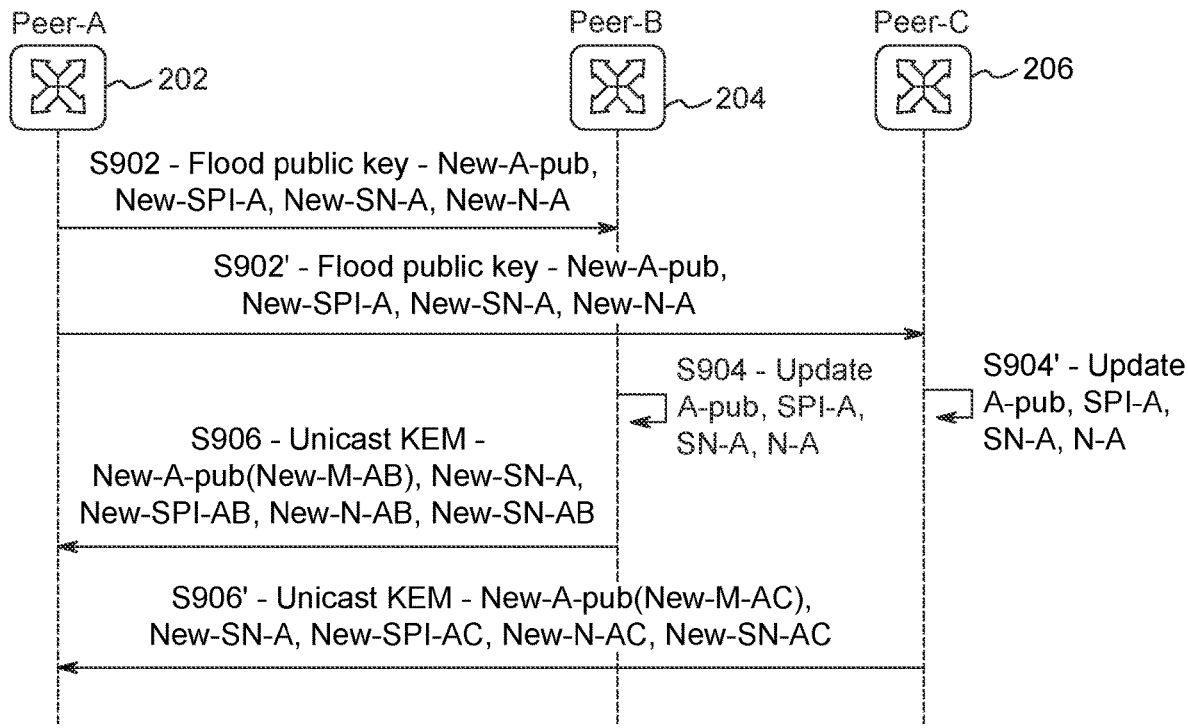
FIG. 9 illustrates a signal flow graph diagram indicating a method for public key rotation, in accordance with an embodiment.

FIG. 9 illustrates a signal flow graph diagram indicating a method for public key rotation, in accordance with an embodiment. In an embodiment, one or more steps of FIG. 9 may be implemented after step S320 of FIG. 3 or at any time after S302 of FIG. 3.

In steps S902 and S902', Peer-A 202 may broadcast (flood) a message at least to Peer-B 204 and Peer-C 206. In an embodiment, the broadcast may be a single broadcast (i.e., steps S902 and S902' may relate to a single broadcast of the message). In an embodiment, the message may include at least a new public key (New-A-pub) associated with Peer-A 202. In an embodiment, the message may further include a new security parameter index (New-SPI-A) assigned by Peer-A 202 for a relation with at least Peer-B 204 and Peer-C 206, a new key sequence number (New-SN-A) assigned by Peer-A 202 for a relation with at least Peer-B 204 and Peer-C 206, a new nonce (New-N-A) assigned by Peer-A 202 for a relation with at least Peer-B 204 and Peer-C 206.

Next, in step S904, Peer-B 204 may update the public key (A-pub), the security parameter index (SPI-A) assigned by Peer-A 202 for a relation with at least Peer-B 204 and Peer-C 206, a key sequence number (SN-A) assigned by Peer-A 202 for a relation with at least Peer-B 204 and Peer-C 206, and the nonce (N-A) assigned by Peer-A 202 for a relation with at least Peer-B 204 and Peer-C 206.

Further, in step S904', Peer-C 206 may update the public key (A-pub), the security parameter index (SPI-A) assigned by Peer-A 202 for a relation with at least Peer-C 206 and Peer-B 204, a key sequence number (SN-A) assigned by Peer-A 202 for a relation with at least Peer-C 206 and Peer-B 204, and the nonce (N-A) assigned by Peer-A 202 for a relation with at least Peer-C 206 and Peer-B 204.

Subsequently, in step S906, Peer-B 204 may transmit a message by way of unicast communication to Peer-A 202. In an embodiment, the message may include a new key seed (New-M-AB) encapsulated with the new public key (New-A-pub) associated with Peer-A 202, a new key sequence number (New-SN-A) assigned by Peer-A 202 for a relation with at least Peer-B 204 and Peer-C 206, a new security parameter index (New-SPI-AB) created by Peer-B 204 for a relation with Peer-A 202, a new nonce (New-N-AB) assigned by Peer-B 204 for a relation with Peer-A 202, and a new key sequence number (New-SN-AB) assigned by Peer-B 204 for a relation with Peer-A 202.

Then, in step S906', Peer-C 206 may transmit a message by way of unicast communication to Peer-A 202. In an embodiment, the message may include a new key seed (New-M-AC) encapsulated with the new public key (New-A-pub) associated with Peer-A 202, a new key sequence number (New-SN-A) assigned by Peer-A 202 for a relation with at least Peer-C 206 and Peer-B 204, a new security parameter index (New-SPI-AC) created by Peer-C 206 for a relation with Peer-A 202, a new nonce (New-N-AC) assigned by Peer-C 206 for a relation with Peer-A 202, and a new key sequence number (New-SN-AC) assigned by Peer-C 206 for a relation with Peer-A 202.

Embodiments of the present disclosure relate to a key management protocol designed for use amongst large numbers of peers using a broadcast communications protocol that may support quantum secure cryptography. Further, the present disclosure is designed to be integrated with broadcast protocols such as an interior gateway protocol (IGP) routing protocol. Herein while routing may be just an example use, it may also be the primary intended use. The present disclosure provides encryption keys for specific secure (encrypted) communications protocols. The primary intended use is for IPsec, but it may also be implemented for other protocols as well. Unlike most of the existing key management protocols, the present disclosure provides keying for one direction only. Bi-directional communications require the described process to be performed separately in both directions. Further, the present disclosure is built on a KEM (Key Encapsulation Mechanism) methodology, and not on a KEX (Key Exchange) methodology (such as Diffie-Hellman key exchange method).

Further, the present disclosure is designed to support post quantum public key algorithms, and large key sizes of post quantum public key algorithms. In essence, the present disclosure is designed to optimize the key management in large networks of fully interconnected peers. The optimization includes minimizing the number of messages required, minimizing the computational effort required, and minimizing the synchronization complexity. The present disclosure's broadcast-based design supports many (all) variants of what "broadcast" means. In particular, broadcast can be traditional broadcast from one peer to many (all) other peers; it can also be broadcast done through a controller where a peer sends to one or more known controllers who then forward the protocol message (first message) to other controllers and to peers; and it can also be broadcast from one peer to many other peers, some of which then relay the protocol message to other peers in a broadcast or unicast method. The disclosed approach also provides for negotiation of algorithms and parameters for the KEM portion of the key management protocol. This is optimized for minimal message passing and synchronization. Further, the disclosed approach provides for negotiation of transforms (including algorithms) to be used for the underlying secure communications protocol.

In addition to the above, the disclosed approach is optimized to a two-message protocol. There is a single broadcast message and a single unicast response. Further, the disclosed approach is integrated with the underlying secure communications protocol. The underlying protocol may be used for the unicast response. The discussed optimized design means that ONLY the underlying secure protocol is required to be passed from peer to peer. Because of the expanded "broadcast" model, the broadcast messages do not need to transit directly from peer to peer, and they can be relayed. Further, because there is no additional protocol other than the conventional (IGP based) broadcast protocol and the conventional data transport protocol, the impact of (and impact on) firewalls, network address translations (NATs), and other filtering devices is minimized.

One of the many technical advantages provided by the present disclosure is the support for transform negotiation between various peers. It may be important to allow for interoperability (negotiations) when peers (such as Peer-A 202, Peer-B 204, and Peer-C 206) on the network support differing encryption algorithms and IPsec encapsulations. There are two situations to be considered during transform negotiation: Algorithms to use for broadcast Key Encapsulation Mechanism itself, and transforms to use for IPsec or for whichever data plane protocol(s) is being used. For broadcast KEM itself, only the public key algorithm used in the KEM may need to be "negotiated". This may be done by prepending an algorithm identifier (ai) before the public key shared by Peer-A 202, and then allowing Peer-A 202 to put multiple public key values (one for each algorithm that peer-A 202 supports) into the first message. And when Peer-B 204 or Peer-C 206 responds, she may choose one algorithm and put an "ai" before the encrypted key seed to indicate which she chose. Further, if Peer-B 204 or Peer-C 206 cannot support any algorithms that Peer-A 202 proposed, then Peer-B 204 or Peer-C 206 cannot respond. Further, to handle algorithm negotiation for IPsec or for any data plane protocol(s) being used, Peer-A 202 may send, in the first message, a list of data plane algorithm identifiers (dpai) including all the data plane encryption algorithms that Peer-A 202 may support. Then, Peer-B 204 may select at least one of the data plane encryption algorithms, and include that dpai (associated with the selected at least one data plane encryption algorithm) in the second message (that is to be transmitted to Peer-A 202).

In summary, the present disclosure enables "Key Rotation". In particular, the present disclosure helps in decoupling the secure transmission of data channel encryption keys (in an example, the secret keys) required for key rotation from the keys required to secure the control channel (in an example, the public keys) itself. Further, "Peer Negotiation" is enabled. In particular, encryption algorithm transforms for negotiation purposes are included in the combined broadcast/peer-to-peer nature of operation of the peers. Further, the distribution of variable size key payloads in different environments may be realized. In particular, support of any size keys and using highly efficient distribution mechanisms adapted to specific networking and/or application environments is allowed. Further, "Peer Authentication" is enabled. In particular, encryption peer authentication may be separated into a separate protocol or built into the proposed packet exchanges between the peers. Further, "Adaptability to different protocols" is enabled. In particular, any encryption architecture that allows for the separation of control and data plane exchanges may take advantage of the present disclosure for encryption key management. The present disclosure also supports key management for quantum resistant cryptographic solutions in a broadcast communication model.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD-ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resorting to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. A method, implemented in a peer-to-peer network for encryption key management, the method comprising:
    receiving, by a second peer, a first broadcast message from a first peer, wherein the first broadcast message comprises at least a public key associated with the first peer;
    generating, by the second peer, a key seed in response to receiving the first broadcast message;
    creating, by the second peer, a second message that comprises the key seed encapsulated with the public key;
    transmitting, by the second peer, the second message to the first peer; and
    in response to transmitting the second message, receiving, by the second peer, a packet from the first peer, wherein the packet comprises data encrypted using a secret key derivable from the key seed and one or more portions of the second message.

2. The method of claim 1, wherein at least a portion of the second message is transmitted in an Internet Protocol security (IPsec) payload.

3. The method of claim 1, further comprising:
    determining, by the second peer, whether the first broadcast message is authentic, wherein generating the key seed is based at least in part on determining whether the first broadcast message is authentic.

4. The method of claim 3, wherein determining whether the first broadcast message is authentic comprises:
    determining whether the first broadcast message is signed by the first peer; or
    determining whether the first broadcast message is received on a previously authenticated connection from a trusted third-party device.

5. The method of claim 1, wherein the second message further comprises:
    a nonce assigned by the second peer for a relation with the first peer, a key sequence number of the first broadcast message, information to determine an inbound Security Association based on which, the data is to be received from the first peer, wherein the inbound Security Association comprises a security parameter index assigned by the second peer for a relation with the first peer, and a key sequence number assigned by the second peer for a relation with the first peer, and wherein the inbound Security Association is associated with the encapsulated key seed of the second message.

6. The method of claim 1, wherein the key seed is sized to a cryptographic algorithm being used by the second peer, and wherein the method further comprises adding, by the second peer, fragmentation at least to the second message.

7. The method of claim 1, wherein the packet is received in a data plane, and wherein the reception of the packet is an acknowledgement indicating that the second message was received by the first peer.

8. The method of claim 1, further comprising:
    determining, by the second peer, a time period during which the second peer will use a same public key for encapsulation.

9. A method, implemented in a peer-to-peer network for encryption key management, the method comprising:
    broadcasting, by a first peer, a first message at least to a second peer, wherein the first message comprises at least a public key associated with the first peer;
    receiving, by the first peer, a second message from the second peer, wherein the second message comprises a key seed encapsulated with the public key, and wherein the key seed is generated at the second peer;
    creating, by the first peer, an outbound Security Association based on which, data is to be transmitted to the second peer, wherein creating the outbound Security Association comprises decapsulating the key seed based at least on the second message;
    creating, by the first peer, a secret key based at least on the key seed and one or more portions of the second message, wherein the secret key is for encrypting the data to be transmitted to the second peer; and
    transmitting, by the first peer, a packet to the second peer, wherein the packet comprises the data encrypted using the secret key.

10. The method of claim 9, further comprising:
    determining, by the first peer, that the first peer intends to establish a secure communication with at least the second peer intending to communicate securely with the first peer, wherein broadcasting the first message is based at least on determining that the first peer intends to establish the secure communication with at least the second peer.

11. The method of claim 9, wherein the first message further comprises:
a nonce assigned by the first peer for a relation with at least the second peer, a key sequence number assigned by the first peer for a relation with at least the second peer, a security parameter index assigned by the first peer for a relation with at least the second peer, and a public port for transmitting the data to the first peer from at least the second peer.

12. The method of claim 11, further comprising:
incrementing, by the first peer, the key sequence number in response to updating one or more portions of the first message.

13. The method of claim 9, wherein broadcasting the first message comprises:
broadcasting the first message to a set of peers, wherein the set of peers comprises at least the second peer; or
broadcasting the first message to a first set of peers which then re-distributes the first message to a second set of peers, wherein the second set of peers comprises at least the second peer; or
transmitting the first message to a controller which then relays the first message to at least the second peer.

14. The method of claim 9, wherein the packet is transmitted in a data plane and on the outbound Security Association, to indicate to the second peer that the second message was received by the first peer.

15. The method of claim 9, further comprising:
determining, by the first peer, a time period during which a same public key is used for encapsulation of the key seed; and
re-keying, by the first peer, the public key based at least in part on determining the time period.

16. The method of claim 9, further comprising:
avoiding, by the first peer, fragmentation at least to the first message.

17. The method of claim 9, wherein the second message further comprises:
a nonce assigned by the second peer for a relation with the first peer, a key sequence number of the first message, information to determine an inbound Security Association based on which, the data is to be received from the first peer, wherein the inbound Security Association comprises a security parameter index assigned by the second peer for a relation with the first peer, and a key sequence number assigned by the second peer for a relation with the first peer, and wherein the inbound Security Association is associated with the encapsulated key seed of the second message.

18. A system in a peer-to-peer network for encryption key management, the system comprising:
a first peer; and
a second peer,
wherein the first peer is operable to:
broadcast, at least to the second peer, a first message comprising at least a public key associated with the first peer;
receive, from the second peer, a second message comprising a key seed encapsulated with the public key, wherein the key seed is generated at the second peer;
create an outbound Security Association based on which data is to be transmitted to the second peer, wherein the outbound Security Association is created by decapsulation of the key seed based at least on the second message;
create a secret key based at least on the key seed and one or more portions of the second message, wherein the secret key is for encrypting the data to be transmitted to the second peer; and
transmit a packet comprising the data encrypted using the secret key, and wherein the second peer is operable to:
receive, from the first peer, the first message;
generate the key seed in response to the reception of the first message;
create the second message comprising the key seed encapsulated with the public key;
transmit, to the first peer, the second message; and
receive, from the first peer, the packet comprising the data encrypted using the secret key derivable from the key seed and the one or more portions of the second message.

19. The system of claim 18, wherein the second peer is further operable to:
determine a time period during which the second peer will use a same public key for encapsulation; and
re-key the secret key based at least in part on the public key.

20. The system of claim 18, wherein the first peer is further operable to:
re-key the public key; and
avoid fragmentation at least to the first message.

* * * * *